United States Patent [19]
Ito et al.

[11] 3,873,124
[45] Mar. 25, 1975

[54] VEHICLE HYDROPNEUMATIC LEVEL ADJUSTING SHOCK ABSORBER

[75] Inventors: Naganori Ito; Hiroshi Aikawa, both of Tokyo, Japan

[73] Assignee: Nissan Motor Company, Limited, Yokohama, Japan

[22] Filed: Mar. 5, 1974

[21] Appl. No.: 448,389

[52] U.S. Cl............................ 280/124 F, 267/64 R
[51] Int. Cl............................................. F16f 5/00
[58] Field of Search............ 280/124 F; 267/DIG. 1, 267/DIG. 2, 64 R, 65 R, 65 A, 65 B, 65 D, 267/122

[56] References Cited
UNITED STATES PATENTS
3,046,003   7/1962   Schultz .......................... 267/DIG. 2
3,810,611   5/1974   Ito .................................... 267/64 R

*Primary Examiner*—Philip Goodman

[57] ABSTRACT

A floating piston of the shock absorber is connected to one end of a rod carrying at the other end an arm controlling fluid inlet and outlet valves in dependence on the level of the vehicle from the ground.

7 Claims, 2 Drawing Figures

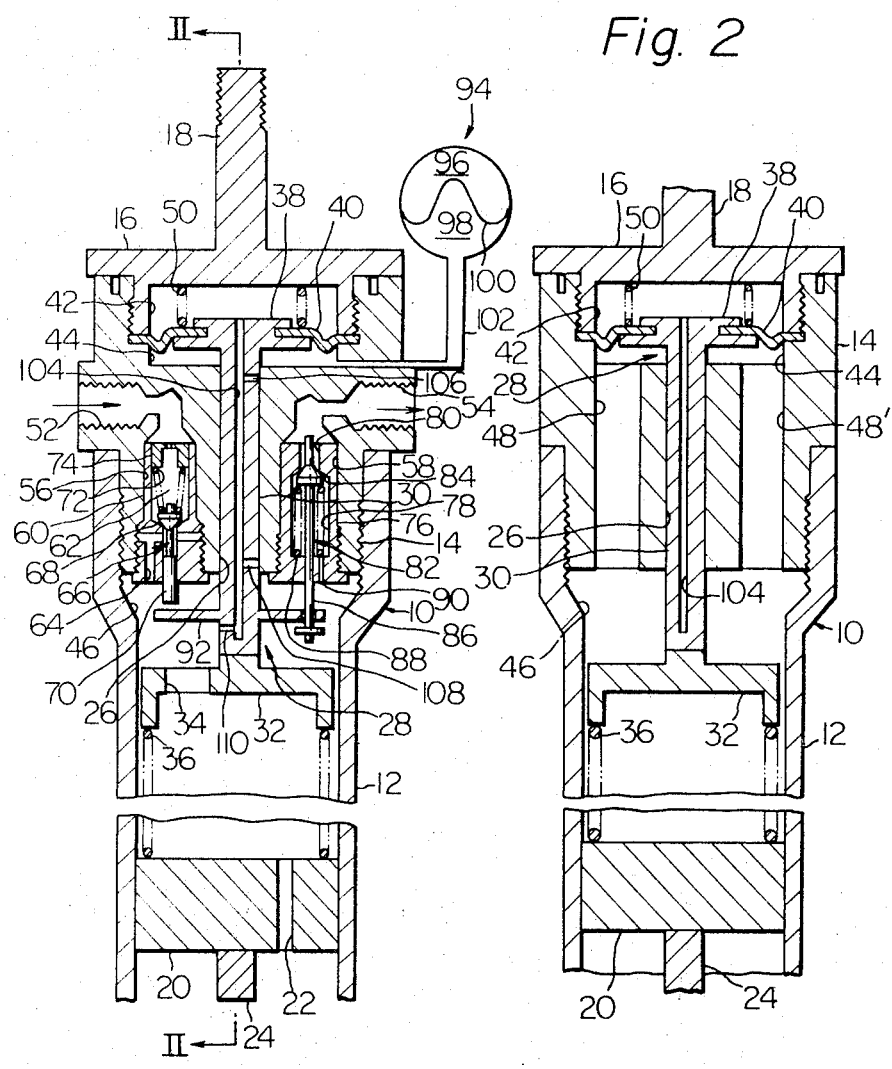

VEHICLE HYDROPNEUMATIC LEVEL ADJUSTING SHOCK ABSORBER

The present invention relates generally to shock absorbers of vehicles and particularly to levelling devices of hydropneumatic shock absorbers.

Hydropneumatic shock absorbers for vehicles are usually provided with levelling devices to maintain the vehicle body at a constant distance to ground regardless of load variations on the vehicle.

A shock absorber of this nature comprises a cylinder which is filled with a hydraulic fluid and a piston which is longitudinally movable in the cylinder. In a usual arrangement, the cylinder is fixed to the body of the vehicle and the piston fixed to an axle. The cylinder is divided by the piston into two separate compartments which are in constant communication with each other through a passageway formed in the piston. The fluid in the two compartments flows through the piston via this passageway in response to relative movement between the cylinder and the piston so that shock and vibrations transferred from a road wheel are dampened out by the restricted flow of the fluid through the passageway in the piston. The cylinder is connected to an air reservoir serving as a pneumatic spring so as to cushion the piston movement. The suspension unit further comprises a floating piston which is resiliently supported at both ends by a levelling spring which is seated between one end face of the piston and one end face of the cylinder and a control spring which is seated between the other end face of the piston and the other end face of the cylinder. Fluid inlet and outlet valves are incorporated in the cylinder and are selectively controlled by the movement of the floating piston in the cylinder. The fluid pressure and volume in the cylinder is varied by means of these valves so that the cylinder and accordingly the body of the vehicle are maintained at a substantially constant level despite the wide variations in the vehicle load.

Spool valves have thus far been used as the fluid inlet and outlet valves of the hydropneumatic shock absorber of this nature, although some other types of valves are used in shock absorbers in rather limited makes. Leaks of the working fluid from the chamber accommodating the valves have thus resulted from the use of the spool valves, creating causes of the fluid pressure in the cylinder to reduce below an operable level when a fluid feed pump is held at rest. A problem has therefore been encountered in that the vehicle body tends to descend even when the load on the vehicle is not very large.

It has accordingly been proposed in some quarters of the industry to make use of poppet valves in lieu of the spool valves with a view to obviating such a problem. Where poppet valves are thus used in the hydropneumatic level-adjusting shock absorber, means such as for example a second floating piston must be incorporated into the suspension unit to respond to the height of the vehicle body from the ground. The second floating piston is positioned in series with the poppet valves so that the overall length of the cylinder and accordingly the length of the suspension unit as such is very large.

For the purpose of avoiding this difficulty, a level-adjusting advanced hydropneumatic shock absorber has been developed which comprises a floating piston positioned parallel to inlet and outlet valves of the poppet type so that the shock absorber can be significantly shortened without sacrificing the functions of the unit. In this advanced version of the hydropneumatic shock absorber, moreover, passageways are formed in the floating piston so as to provide communication across the floating piston when the floating piston is moved into a position in which the fluid inlet or outlet valve is actuated. The free piston is thus capable of sensitively responding to the actuation of the fluid inlet or outlet valve so that excess replenishment and excess drainage of the working fluid of the cylinder can be prevented.

Further research and development efforts have been made in quest of more small-sized and compact hydropneumatic shock absorbers. The present invention has resulted from such efforts and is based on a finding that the overall dimensions of the shock absorber can be effectively reduced provided a floating piston having a reduced diameter can be used without adversely affecting the normal functions of the shock absorber. If the diameter of the floating piston is reduced, the floating piston is subjected to an extremely large differential pressure during a rise or a fall of the road wheel relative to the vehicle body level. Where such an arrangement is made in the above mentioned type of shock absorber having the passageways formed in the floating piston for the prevention of the excess replenishment and excess drainage of the working fluid in the cylinder, leaks of the fluid caused from the passageways open to grooves of the fluid inlet and outlet spool valves exceed the volume of fluid flowing through a "dash-pot" or damper which is provided to prevent rapid motions of the floating piston. This results in inability of the floating piston to dampen out the shocks and vibrations transferred to the shock absorber from the corresponding road wheel.

If, conversely, the diameter of the floating piston is increased, then there will result a reduction in the differential pressure to act upon the floating piston during the rise or fall of the road wheel. Where such an arrangement is made in the previously described shock absorber having the passages to prevent the excess replenishment and excess drainage of the fluid of the cylinder, an increased amount of fluid will pass through the dash-pot or damper so that the leaks of the fluid from the passages open to the grooves of the spool valves become small relative to the volume of the fluid passed through the dash-pot. This will provide ease of controlling the strokes of the floating piston through adjustment of the size and capacity of the dash-pot and at the same time, enable the floating piston to provide optimum performance characteristics. All these advantages are, however, offset by enlarged overall dimensions of the shock absorber if the floating piston of the unit is arranged in parallel to the spool valves incorporated in the unit. This means that the large-sized floating piston is not compatible with the shock absorber having the arrangement to prevent the excess replenishment and excess drainage of the hydraulic fluid.

The present invention has been completed with these various aspects of the hydropneumatic level-adjusting shock absorber in mind.

It is, accordingly, an object of the present invention to provide an improved vehicle hydropneumatic level-adjusting shock absorber of small and compact construction which can be readily incorporated into an automotive vehicle.

It is another object of the invention to provide an improved vehicle hydropneumatic level-adjusting shock absorber comprising a hydraulic cylinder having a shortened overall length.

It is still another object of the invention to provide an improved vehicle hydropneumatic level-adjusting shock absorber having a floating piston which is arranged in parallel to valves incorporated into the cylinder so that the overall length of the cylinder is significantly shortened.

It is still another object of the invention to provide an improved vehicle hydropneumatic level-adjusting shock absorber in which the floating piston has a small-sized pressure-receiving portion to permit further reduction of the overall length of the cylinder.

It is still another object of the invention to provide an improved vehicle hydropneumatic level-adjusting shock absorber in which leaks of working fluid from fluid passages are minimized to the extent achieved where a large-sized floating piston is utilized.

It is still another object of the invention to provide an improved vehicle hydropneumatic level-adjusting shock absorber which is provided with arrangements adapted to prevent excess replenishment and excess drainage of working fluid to and from the cylinder when the fluid pressure in the cylinder is being changed.

It is still another object of the present invention to provide an improved vehicle hydropneumatic level-adjusting shock absorber offering reliability in maintaining the body of an automotive vehicle substantially at a constant level despite wide variations in the loads on the vehicle.

It is still another object of the invention to provide a vehicle hydropneumatic level-adjusting shock absorber which is simple in construction and economical to manufacture.

To accomplish these objects, the present invention proposes to have incorporated in the cylinder a floating piston which is largely in the form of a rod and which has a pressure-receiving portion carried at one end of the rod portion and connected to the cylinder by means of a flexible partition member such as for example a diaphragm. The flexible partition member serves as an additional pressure-receiving element cooperating with the pressure-receiving portion of the floating piston so that the pressure-receiving portion of the floating piston can be made significantly smaller than those of the usual floating pistons used in the prior art suspension units of the described natures. Since, moreover, the floating piston is largely in the rod form, the piston can be arranged parallel to valves incorporated into the cylinder and, as a consequence, the overall length can be considerably reduced as compared with the prior art shock absorbers in which the floating pistons are arranged in series with the valves.

Thus, the hydropneumatic level-adjusting shock absorber according to the present invention comprises a cylinder having inlet and outlet ports for a hydraulic fluid to operate in the cylinder, a first piston which is longitudinally slidable in the cylinder and which is formed with a passageway providing constant communication across the first piston, the cylinder and the first piston being connected between a body structure of a vehicle and an axle of a road wheel, first and second valves which are carried on the cylinder and which are operative on the inlet and outlet ports, respectively, of the cylinder when actuated, a piston guide member which is disposed in and fast on the cylinder and which has an elongate bore extending throughout the length of the piston guide member, a second piston longitudinally movable in the cylinder and having a rod portion longitudinally slidable throughout the elongate bore in the guide member and extending substantially in parallel to the first and second valves, a pressure-receiving portion formed at one end of the rod portion and located in the vicinity of one end wall of the cylinder and a valve-actuating portion formed at the other end of the rod portion and engageable with the first and second valves for selectively actuating the first and second valves depending upon the longitudinal position of the second piston relative to the cylinder, a flexible partition member such as for example a diaphragm connecting the pressure-receiving portion of the second piston to the cylinder for forming in the cylinder a first chamber defined between the end wall of the cylinder and the combination of the pressure-receiving portion of the second piston and the flexible partition member and a second chamber in the remaining free space in the cylinder and in communication with the inlet and outlet ports of the cylinder over the first and second valves, respectively, a first spring seated between the first and second pistons, and a second spring seated between the end wall of the cylinder and the combination of the pressure-receiving portion of the second piston and the flexible partition member so that the second piston is suspended between the first and second spring means.

The shock absorber may further comprise, where desired, means operative to prevent excess replenishment of the fluid to the second chamber from the fluid inlet port and excess drainage of the fluid from the second chamber to the fluid outlet port, such means comprising a first passageway for providing fluid communication from the second chamber to the first chamber when the second piston is moved to a position actuating the first valve to open the fluid inlet port and a second passageway for providing fluid communication from the first chamber to the second chamber when the second piston is moved to a position actuating the second valve to open the fluid outlet port.

Other features and advantages of the automotive hydropneumatic suspension unit according to the present invention will become more apparent from the following description taken in conjunction with the accompanying drawings, in which:

FIG. 1 is a longitudinal sectional view of a preferred embodiment of a shock absorber according to the present invention, and FIG. 2 is a longitudinal sectional view taken on line II—II of FIG. 1, viz., on a plane perpendicular to the plane of the section shown in FIG. 1.

Reference will now be made concurrently to FIGS. 1 and 2. The hydropneumatic level-adjusting shock absorber embodying the present invention comprises a cylinder 10 which is composed of an elongate cylindrical member 12, a piston guide member 14 connected to an end portion of the cylindrical member 12 and an end plug member 16 connected to an end portion of the piston guide member 14 for closing the cylinder 10. The end plug member 16 has a longitudinal extension 18 through which the cylinder 10 is fixed to a body structure (not shown) of an automotive vehicle.

A piston 20 is longitudinally slidably received in the cylindrical member 12, having formed therein a restricted passageway 22 which provides constant fluid communication across the piston 20. A plunger 24 projects from the piston 20 in a direction opposite to the end plug member 16. Though not shown in the drawings, the plunger 24 projects longitudinally externally from the cylindrical member 12 and is fixed to an axle of a road wheel of the vehicle. Where desired, the connections of the cylinder 10 and the plunger 24 to the vehicle body and the axle may be converted so that the cylinder 10 is fixed through the extension 18 to the axle of the road wheel and the plunger 24 is fixed to the body structure of the vehicle.

The piston guide member 14 has centrally formed therein an elongate bore 26 extending throughout the length of the guide member 14. A floating piston 28 has a rod portion 30 which is longitudinally slidable throughout the elongate bore 26 and which has its end portions projecting from both longitudinal ends of the piston guide member 14, as shown. The rod portion 30 of the floating piston 28 carries at its end projecting toward the piston 20 a spring seat member 32 which is longitudinally slidably received in the cylindrical member 12 and which has an opening 34 providing unrestricted communication across the spring seat member 32. A levelling spring 36 is seated at one end on this spring seat member 32 and at the other end on the piston 20 so that the spring seat member 32 and accordingly the floating piston 28 connected thereto are urged away from the piston 20, viz., toward the end plug member 16.

The floating piston 28 has a pressure-receiving portion 38 which is carried at the end of the rod portion 30 projecting toward the end plug 16 of the cylinder 10. The pressure-receiving portion 38, shown as being in a disc form, is located in the vicinity of the end plug member 16 and is connected to an inner surface of the end portion of the piston guide member 14 through a flexible partition member such as for example a diaphragm 40. The combination of the pressure-receiving portion 38 of the floating piston 28 and the flexible partition member 40 thus divides the space in the cylinder 10 into a first chamber 42 defined between such a combination and the end plug member 16 and a second chamber (no numeral) formed in the remaining free space in the cylinder 10. The second chamber is further divided into first compartment 44 which is defined between the combination of the pressure-receiving portion 38 and the flexible partition member 40 and the adjacent longitudinal end face of the piston guide member 14 and a second compartment 46 which is defined between the other longitudinal end face of the piston guide member 14 and the piston 20. As seen in FIG. 2, these first and second compartments 44 and 46 are in unrestricted communication with each other through passageways 48 and 48' formed in the piston guide member 14. These passageways 48 and 48' are shown as being in diametrically opposed relationship in the cylinder 10. In the first chamber 42 is mounted a control spring 50 which is seated at one end on an inner face of the end plug member 14 and at the other end on the combination of the pressure-receiving portion 38 of the floating piston 28 and the flexible partition member 40. Thus, the floating piston 28 is urged away from the end plug member 14 and is in this manner suspended in a balanced condition between the levelling spring 36 and the control spring 50.

The piston guide member 14 is formed with fluid inlet and outlet ports 52 and 54, respectively, which are shown as being in diametrically opposed relationship in the cylinder 10 and first and second cavities 56 and 58 which are located in proximity to the fluid inlet and outlet ports 52 and 54, respectively. The first cavity 56 has mounted therein a valve support member 60 which is formed with a bore 62 communicating with the fluid inlet port 52 and a passageway 64 communicating with the second compartment 46. A valve 66 has a valve head 68 mounted within the bored valve support member 60 and a valve stem 70 which is longitudinally slidably received in the valve support member 60 and which projects from the support member 60 into the second compartment 46. In the bore 62 of the valve support member 60 is also mounted a preload spring 72 which is seated at one end on the head 68 of the valve 66 and at the other end on an apertured spring seat member 74 received on the valve support member 60 as seen in FIG. 1. The valve 66 is accordingly biased by the action of the preload spring 72 toward a position to close to block the communication between the fluid inlet port 52 and the second compartment 46. Likewise, the second cavity 58 formed in the piston guide member 14 has mounted therein a valve support member 76 having a bore 78 communicating with the second compartment 46 and an opening 80 communicating with the fluid outlet port 54. A valve 82 has a valve head 84 mounted within the bored valve support member 76 and a valve stem 86 which longitudinally projects into the second compartment 46. The valve support member 76 has mounted in its bore 78 a preload spring 88 which is seated at one end on the head 84 of the valve 82 and at the other end on a spring seat member 90 which is received in the bored valve support member 76. The spring seat member 90 is apertured to provide communication between the bore 78 in the valve support member 76 and the second compartment 46 and slidably receives therein the stem 86 of the valve 82, as seen in FIG. 1. The valve 82 is thus urged by the action of the preload spring 88 toward a position to close to block the communication between the second compartment 46 and the fluid outlet port 54.

The floating piston 28 has a valve-actuating arm 92 which is formed at the end of the rod portion 30 of the floating piston projecting into the second compartment 46 and which is selectively engageable with the stems 70 and 86 of the valves 66 and 82, respectively. When the floating piston 28 is moved relative to the cylinder in one direction, viz., toward the end plug 14, then the valve-actuating arm 92 is brought into abutting engagement with the stem 70 of the valve 66, which consequently opens to establish communication between the fluid inlet port 52 and the second compartment 46 through the bore 72 in the valve support member 60. When, conversely, the floating piston 28 is moved relative to the cylinder 10 in the other direction, viz., away from the end plug member 14, then the valve-actuating arm 92 is brought into abutting engagement with the stem 86 of the valve 82 so that the valve 82 opens to establish communication between the second compartment 46 and the fluid outlet port 54. The fluid pressure in the first and second compartments 44 and 46 (which communicate with each other through the passageways 48 and 48' as previously discussed) is in this manner increased or decreased by the valve 66 or 82 depending upon the longitudinal position of the floating piston 28 relative to the cylinder 10. Such a relative position of the floating piston 28 is also dictated by a fluid pressure in the first chamber 42 which is filled with hydraulic fluid of constant mass.

Designated by reference numeral 94 is a pneumatic spring which dampens the rapid changes of the fluid pressure acting on the floating piston 28. The pneumatic spring 94 has an air chamber 96 filled with air under pressure and a hydraulic fluid chamber 98 which is in constant communication with the first compartment 44 in the cylinder 10 through a passageway 102. The chambers 96 and 98 are separated from each other by a flexible partition member 100 such as for example a diaphragm.

The shock absorber shown in FIGS. 1 and 2 is further provided with an arrangement which is adapted to prevent excess replenishment of the hydraulic fluid from the fluid inlet port 52 to the first and second compartments 44 and 46 when the valve 66 opens and excess drainage of the hydraulic fluid from the first and second compartments 44 and 46 to the fluid outlet port 54 when the valve 82 opens. For this purpose, the rod portion 30 of the floating piston 28 is formed with an elongate bore 104 which is open at one end to the first chamber 42 and closed at the opposite end located in the end of the rod portion 30 projecting into the second compartment 46. The rod portion 30 is further formed with a first opening 106 which is located adjacent to the pressure-receiving portion 38 and a second opening 108 which is located adjacent to the end of the rod portion 30 opposite to the pressure-receiving portion 38. The first opening 106 is arranged to provide communication between the first chamber 42 and the first compartment 44 through the elongate bore 104 when the floating piston 28 is moved in the previously mentioned first direction, viz., closer to the end plug member 14. Likewise, the second opening 108 is arranged to provide communication between the first chamber 42 and the second compartment 46 when the floating piston 28 is moved in the previously mentioned second direction, viz., remoter from the end plug member 14. Where desired, moreover, the rod portion 30 of the floating piston 28 may be further formed with a third opening 110 providing constant restricted communication between the first chamber 42 and the second compartment 46 to prevent rapid motions of the piston 28 when the fluid pressure in the second compartment 46 is rapidly changed.

When, now, the load on the vehicle is increased and consequently the cylinder 10 is lowered, then the piston 20 is moved upwardly relative to the cylinder 10 so that the floating piston 28 is also moved upwardly relative to the cylinder 10 by means of the levelling spring 36. The valve-actuating arm 92 of the floating piston 28 then abuts against the stem 70 of the valve 66, which against the action of the preload spring 72 opens to establish fluid communication from the fluid inlet port 52 to the second compartment 46 and through the passageways 48 and 48' in the piston guide member 14 to the first compartment 44. The fluid pressure thus increases in the first compartment 44 so that the pressure-receiving member 38 and the flexible partition member 40 are urged upward, viz., toward the end plug member 14. The cylinder 10 in its entirety is consequently urged upward by the fluid pressure in the first chamber 42 so that the vehicle body is raised to its initial level in relation to ground. When the initial level has thus been reached, the valve-actuating arm 92 of the floating piston 28 is disengaged from the stem 70 of the valve 66, which is closed by the action of the preload spring 72. The fluid communication between the fluid inlet port 52 and the second compartment 46 is blocked by the valve 66 so that the shock absorber maintains the condition thus established.

When, conversely, the load on the vehicle is decreased and consequently the cylinder 10 is raised, then the piston 20 is moved downwardly relative to the cylinder 10 so that the floating piston 28 is also moved downward relative to the cylinder 10 by means of the levelling spring 36. The valve-actuating arm 92 of the floating piston 28 is then brought into engagement with the stem 86 of the valve 82, which consequently opens against the action of the preload spring 88. Fluid communication is accordingly established between the second compartment 46 and through the passages 48 and 48' between the first compartment 44 and the fluid outlet port 54. The fluid in the first and second compartments 44 and 46 is therefore drained through the fluid outlet port 54 so that the fluid pressure in the first fluid chamber 42 decreases. The pressure-receiving portion 38 of the floating piston and the flexible partition member 40 are thus urged away from the end plug member 14, causing the cylinder 10 to move downwardly relative to the floating piston 28. The valve-actuating arm 92 of the floating piston 28 is accordingly disengaged from the stem 86 of the valve 82, which is closed by the action of the preload spring 88. The communication between the fluid outlet port 54 and the first and second compartments 44 and 46 is in this manner blocked so that the shock absorber is maintained in the condition thus established and at the same time the vehicle body is held at its initial level relative to ground.

During the condition in which communication is established between the fluid inlet port 52 and the first and second compartments 44 and 46, the first opening 106 in the rod portion 30 of the floating piston 28 is located to provide communication from the first compartment 44 and accordingly the second compartment 46 to the first chamber 42 through the elongate bore 104 in the rod portion 30. During the condition in which communication is established between the fluid outlet port 54 and the first and second compartments 44 and 46, on the other hand, the second opening 108 in the rod portion 30 of the floating piston 28 is located to provide fluid communication from the first chamber 42 to the first and second compartments 44 and 46. In either of these conditions, the working fluid exchanged between the first chamber 42 and the second chamber consisting of the compartments 44 and 46 enables the floating piston 28 to sensitively respond to the balancing actions of the levelling spring 36 and the control spring 50. This prevents the working fluid from being excessively admitted to the second chamber or from excessively drained therefrom.

Once the floating piston 28 is held at rest relative to the cylinder 10 and accordingly the vehicle body is restored to its initial level relative to ground, both of the first and second openings 106 and 108, respectively, in the rod portion 30 of the floating piston 28 are closed by the piston guide member 14 with the result that the first chamber 42 is permitted to communicate with the first and second compartments 42 and 44 through the restricted opening 110 which is also formed in the rod portion 30. Under these conditions, the floating piston 28 is kept from shock and vibrations resulting from the falls and rises of the road wheel relative to vehicle body level.

What is claimed is:

1. A hydropneumatic level-adjusting shock absorber for a vehicle comprising a cylinder having inlet and outlet ports for a hydraulic fluid to operate in the cylinder, a first piston longitudinally slidable in the cylinder and formed with a passageway providing constant fluid communication across the first piston, the cylinder and the first piston being connected between a body structure of the vehicle and an axle of a road wheel, first and second valves which are carried on the cylinder and which are operative on the inlet and outlet ports, respectively, of the cylinder when actuated, a piston guide member disposed in and fast on said cylinder and having an elongate bore extending throughout the length of the piston guide member, a second piston longitudinally movable in the cylinder and having a rod portion longitudinally slidable throughout the elongate bore in said guide member and extending substantially in parallel to said first and second valves, a pressure-receiving portion formed at one end of the rod portion and located in the vicinity of one end wall of the cylinder and a valve-actuating portion formed at the other end of the rod portion and engageable with said first and second valves for selectively actuating the first and second valves depending upon the longitudinal position of the second piston relative to the cylinder, a flexible partition member connecting said pressure-receiving portion to the cylinder for forming in the cylinder a first chamber defined between said end wall of the cylinder and the combination of the pressure-receiving portion of the second piston and the flexible partition member and a second chamber in the remaining free space in the cylinder and in communication with said inlet and outlet ports over the first and second valves, respectively, a first spring seated between the first and second pistons, and a second spring seated between said end wall of the cylinder and said combination so that the second piston is suspended between the first and second spring means.

2. A hydropneumatic level-adjusting shock absorber as set forth in claim 1, further comprising means operative to prevent excess replenishment of the fluid to said second chamber from said inlet port and excess drainage of the fluid from said second chamber to said outlet port and comprising first passage means for providing fluid communication from said second chamber to said first chamber when the second piston is moved to a position actuating the first valve to open said inlet port and second passage means for providing fluid communication from said first chamber to said second chamber when the second piston is moved to a position actuating the second valve to open said outlet port.

3. A hydropneumatic level-adjusting shock absorber as set forth in claim 1, in which said piston guide member divides said second chamber into a first compartment defined between said combination of the pressure-receiving portion and the flexible partition member and a longitudinal end face of the piston guide member adjacent to said combination and a second compartment defined between said first piston and the other longitudinal end face of the piston guide member, said piston guide member being formed with a passageway providing constant communication between said first and second compartments.

4. A hydropneumatic level-adjusting shock absorber as set forth in claim 3, in which the first valve opens to establish fluid communication between said inlet port and said second compartment when said second piston is longitudinally moved relative to said cylinder toward said end wall of the cylinder and wherein the second valve opens to establish fluid communication between said outlet port and said second compartment when said second piston is moved relative to the cylinder away from said end wall of the cylinder.

5. A hydropneumatic level-adjusting shock absorber as set forth in claim 3, in which said rod portion of said second piston is formed with an elongate bore which is open at one end to said first chamber, a first opening for providing communication between said elongate bore in the rod portion and said first compartment when the floating piston is moved relative to the cylinder toward said end wall of the cylinder and a second opening for providing communication between said elongate bore in the rod portion and said second compartment when said second piston is moved relative to the cylinder away from said end wall of the cylinder.

6. A hydropneumatic level-adjusting shock absorber as set forth in claim 5, in which said rod portion of the second piston is further formed with a third opening for providing constant and restricted communication between said elongate bore in the rod portion and said second compartment.

7. A hydropneumatic level-adjusting shock absorber as set forth in claim 1, further comprising a pneumatic spring having an air chamber, a hydraulic fluid chamber which is in constant communication with said second chamber, and a flexible partition member separating the air chamber and the hydraulic fluid chamber.

* * * * *